United States Patent [19]

Newsome

[11] 4,381,108
[45] Apr. 26, 1983

[54] DEVICE FOR ALIGNING SIGNATURES FED IN SHINGLED RELATION

[76] Inventor: John R. Newsome, R.R. #1, Box 58A, Shumway, Ill. 62461

[21] Appl. No.: 278,403

[22] Filed: Jun. 29, 1981

[51] Int. Cl.³ ............... B65H 29/66; B65H 31/38
[52] U.S. Cl. ............................. 271/198; 198/456; 198/817; 271/221; 271/240
[58] Field of Search ............ 271/198, 202, 203, 216, 271/221, 222, 238, 240, 248, 250; 198/456, 627, 817; 414/28, 36

[56] References Cited

U.S. PATENT DOCUMENTS

| | | | |
|---|---|---|---|
| 1,448,301 | 3/1923 | Hotchkiss | 271/221 |
| 1,733,221 | 10/1929 | Fuller | 198/456 |
| 2,488,551 | 11/1949 | Nordquist et al. | 271/240 |
| 4,015,843 | 4/1977 | Tennant | 271/240 |
| 4,087,001 | 5/1978 | Daisley | 198/456 |

Primary Examiner—Robert B. Reeves
Assistant Examiner—Donald Hajec
Attorney, Agent, or Firm—Leydig, Voit, Osann, Mayer & Holt, Ltd.

[57] ABSTRACT

A jogger for aligning signatures fed in shingled relation on a delivery belt. The delivery belt is straddled by a pair of upstanding guide belts presenting opposed faces to the edges of the signatures. Each guide belt has an upstream sheave and a downstream sheave mounted on vertical shafts and which are driven in unison with one another and at the same speed as the delivery belt. The guide belts are convergently arranged, with the downstream sheaves being spaced to define between them a discharge opening having the width of the stream in the aligned state. The upstream sheaves are spread apart with respect to the downstream sheaves by substantially the same amount of offset to define a funnel-like entryway adequate to accommodate entry of the stream in non-aligned condition with individual signatures irregularly displaced from the stream. A pulsating shifter is provided behind the presented faces of the belts and coupled to the driving means for repetitively moving the faces from a reference position to a thrown position in which the belts are angularly bowed mutually inwardly toward the stream, dividing each face into an upstream portion and a downstream portion. The throw of the shifter means is such that the downstream portion in its thrown position is substantially parallel to the direction of movement of the stream.

27 Claims, 21 Drawing Figures

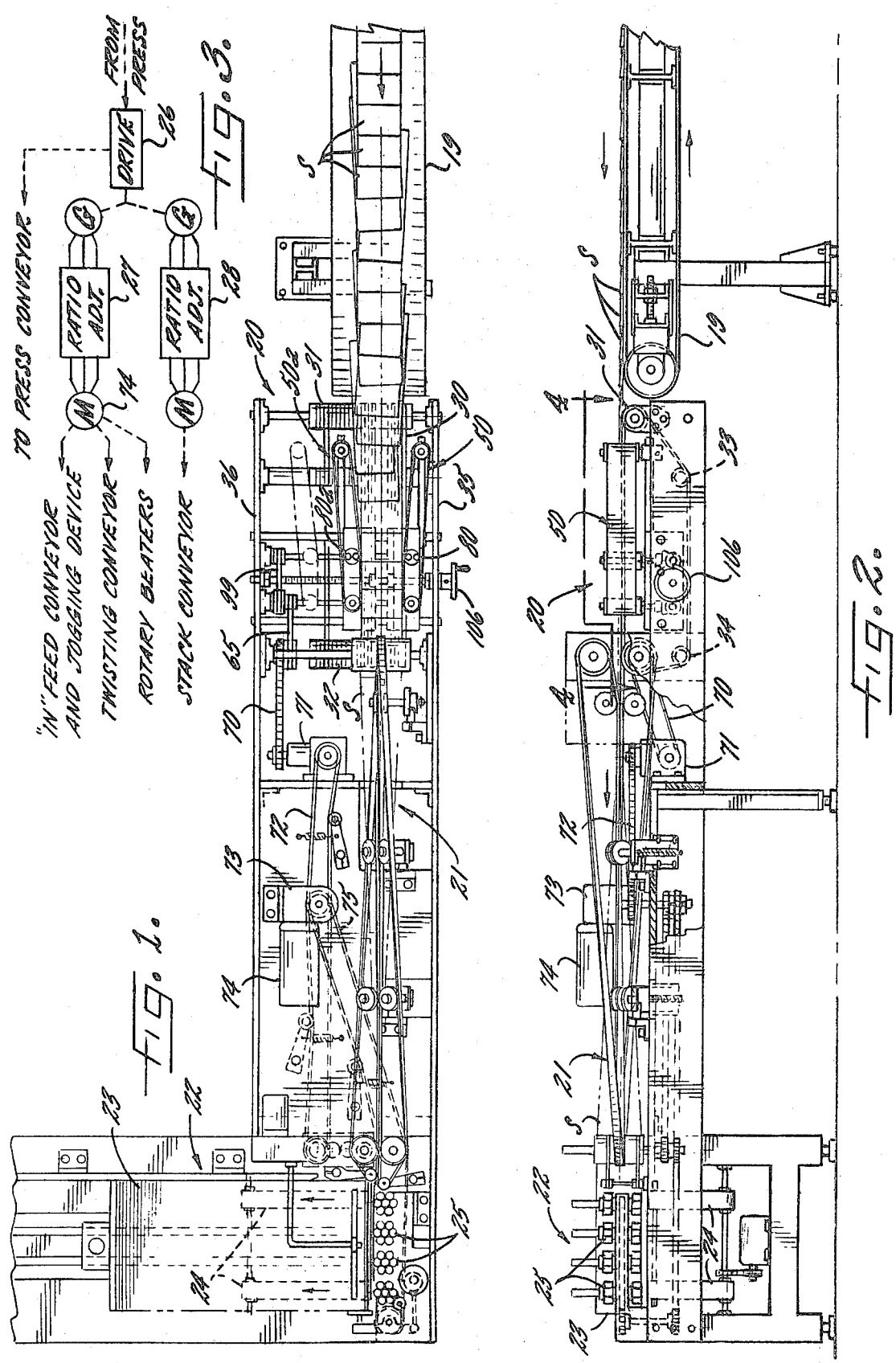

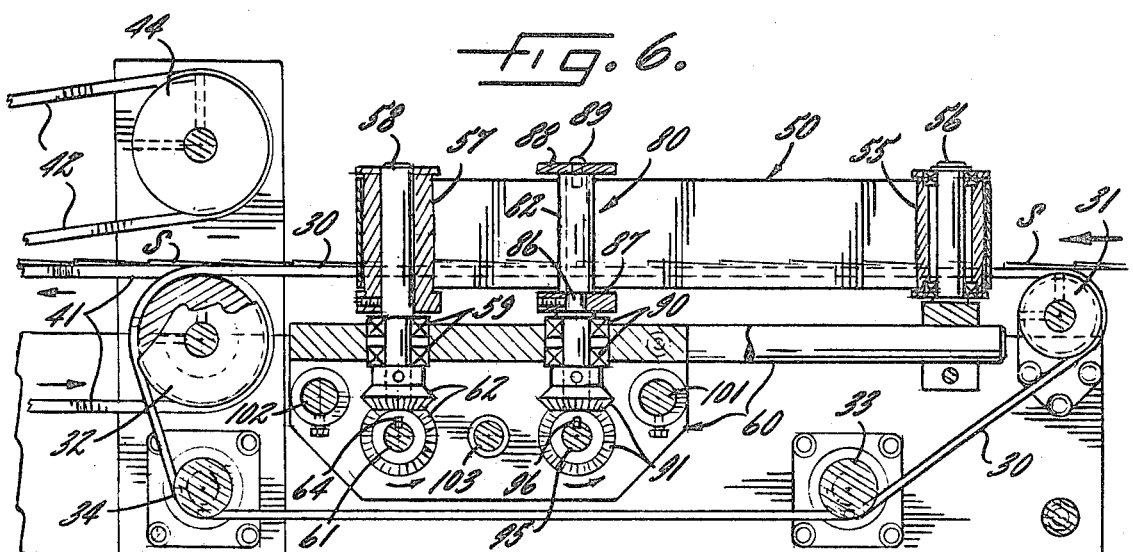
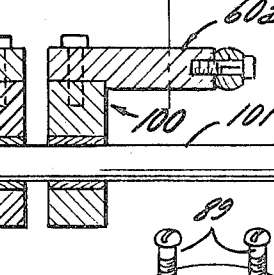
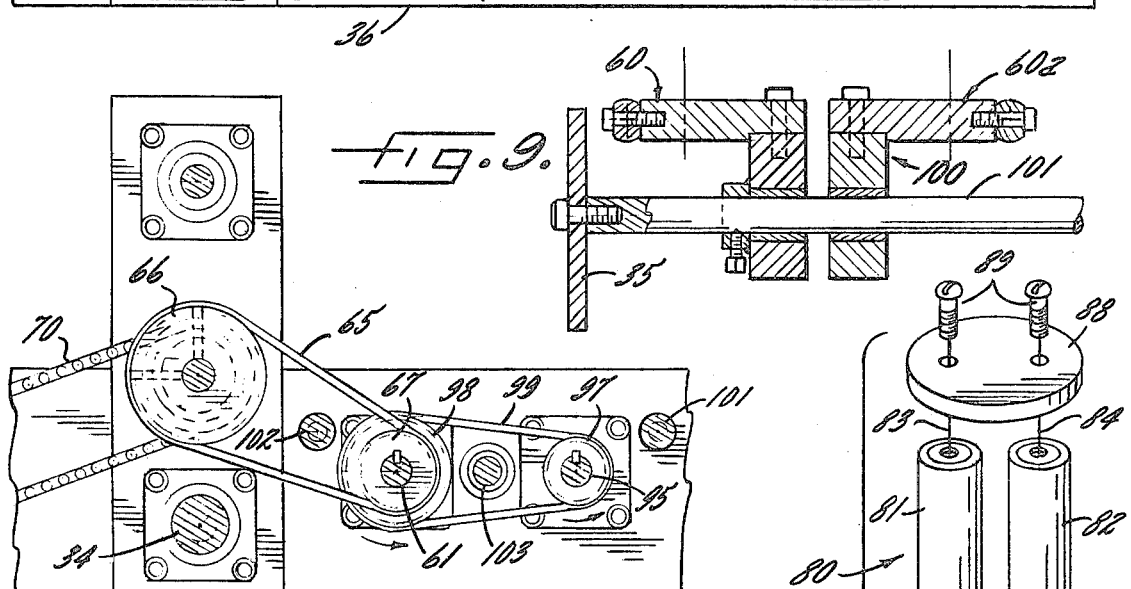
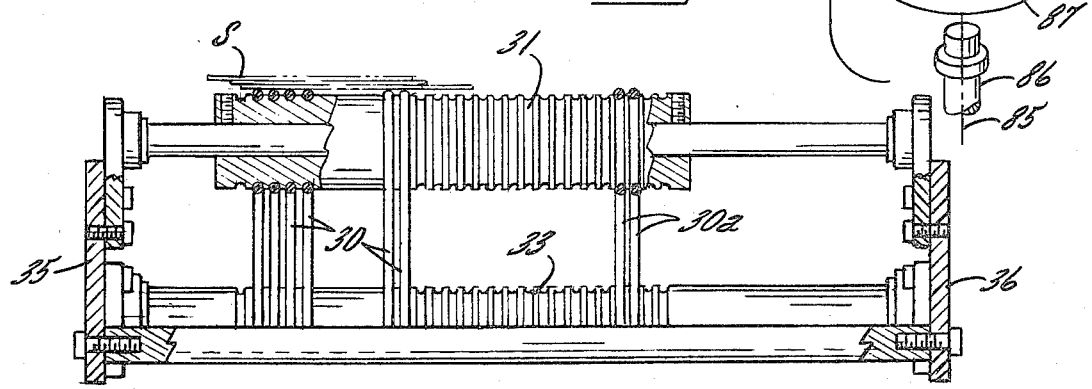

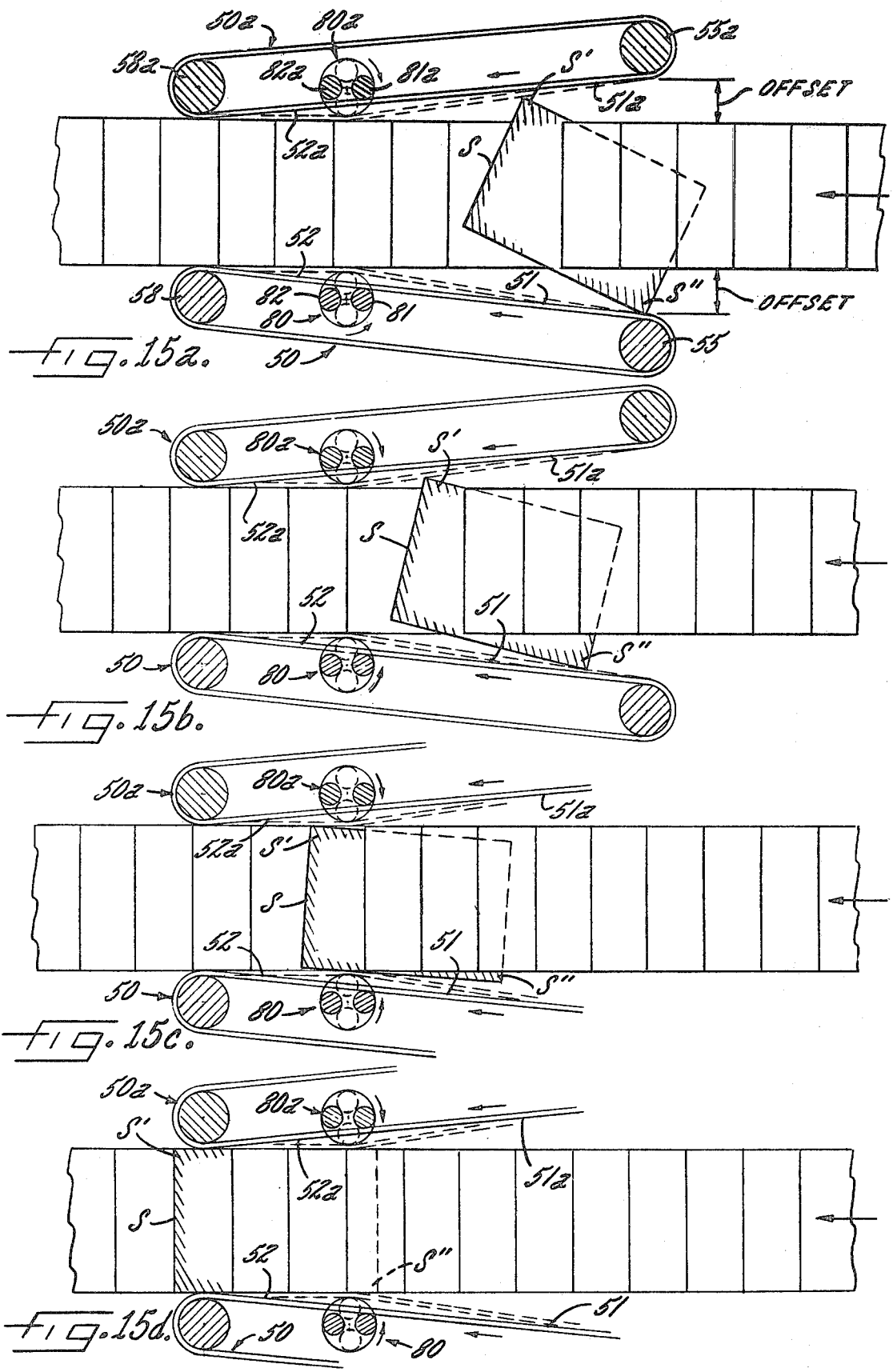

DEVICE FOR ALIGNING SIGNATURES FED IN SHINGLED RELATION

In the printing of books, periodicals and other publications, groups of pages, or signatures, are delivered in shingled relation on a delivery belt for subsequent stacking and bundling. Particularly where the product is to be bound, it is necessary to have a precise, monolithic stack, and this requires that the signatures be in an accurately aligned stream on the delivery belt.

To achieve accurate alignment it has been customary in the past to employ vibratory joggers acting upon the presented edges of the signatures on either one or both sides of the stream. Such joggers have worked satisfactorily where the amount of misalignment of a given signature with respect to the stream is small, where the signatures are made of relatively stiff paper stock, and where the friction between adjacent signatures is not excessive. Conventional joggers have, however, proved completely inadequate under more severe conditions of misalignment and using flimsy stock having a high coefficient of friction. In such event the engaged edge, or corner, of the signature is simply bent over rather than being pushed into the desired aligned position, thereby compounding the misalignment and making precise stacking impossible.

It is accordingly an object of the present invention to provide a jogger for misaligned signatures on a delivery belt which is capable of jogging the signatures into aligned position regardless of the amount of initial misalignment, that is, regardless of the displacement of an individual signature from the stream. It is a more specific object of the invention to provide a jogging apparatus which does not not attempt to push a displaced signature into the confines of the stream in a single stroke but which accomplishes re-alignment progressively in the form of small amplitude nudges which are repeated until the signature is restored to aligned condition. It is therefore an object to provide a vibratory jogger in which the amplitude of vibratory movement is only a small fraction of the total available correction.

It is a related object to provide a jogging device for signatures which is particularly well suited for aligning a signature which is erratically skewed with respect to the stream and which therefore presents projecting corners both at the leading and trailing edges and in which alignment of the final corner of the trailing edge cannot act to misalign the previously aligned corner of the leading edge. In other words it is an object to provide a jogging device which insures alignment of the stream regardless of the direction or angle of the displaced signature at the entryway.

It is another object related to the foregoing to provide a jogging device in which a misaligned signature is subjected to a series of edgewise impacts but in which each impact stroke, while beginning at high velocity, terminates at zero velocity to insure that the signatures do not over-travel beyond the desired aligned condition.

It is an object of the invention in one of its aspects to provide a jogging device which achieves perfect alignment in two stages, first by acting upon the edge of a signature which is displaced from the stream and then acting upon the aligned stream to achieve a final degree of precision.

It is another object of the invention to provide a vibratory jogging device which is of universal utility, capable of acting upon signatures having a wide variation in size and thickness, stiffness of paper stock, and wide variations in the degree of friction between adjacent signatures. It is also an object to provide a vibratory jogger which is capable of acting reliably over a wide speed range, up to the highest speeds encountered in printing press and binding installations, with the rate of vibration increasing and decreasing automatically in step with the speed of delivery.

It is yet another object to provide a jogger which acts upon a vibratory principle but in which the vibrated mass and amplitude of vibration are lower than in conventional joggers thereby achieving smooth, quiet operation.

It is still another object of the invention to provide a vibratory jogger for signatures and the like which capitalizes upon the limited longitudinal elasticity inherent in a belt and sheave system and which enables the number of moving parts to be reduced to a minimum. Thus it is a general object to provide a vibratory jogger which is simple and economical to construct and which is capable of operating reliably, without care or maintenance, over long periods of time.

It is still another object to provide a vibratory jogger which may be operated by relatively unskilled personnel and which may be easily and quickly adjusted to accommodate signatures having a wide range of size.

While it is an object to provide a jogger for signatures intended for stacking and bundling, it is an object to provide a jogger which is not limited to such usage and which may be employed wherever a stream of flat articles of rectangular configuration are delivered on a conveyor belt in shingled relation.

Other objects and advantages of the invention will become apparent upon reading the attached detailed description and upon reference to the drawings in which:

FIG. 1 shows, in plan view, a device for jogging signatures on a delivery belt into an aligned stream and for subsequently twisting, stacking and bundling the signatures.

FIG. 2 is an elevational view corresponding to FIG. 1.

FIG. 3 is a schematic diagram of a slaved driving system which may, for example, be of the servo type.

FIG. 6 is a fragmentary elevational view looking along line 6—6 in FIG. 4.

FIG. 6a is an exploded view, in perspective, showing a pulsating shifter in the form of a roller assembly.

FIG. 7 is a fragmentary elevational view looking along line 7—7 in FIG. 4.

FIG. 8 is a fragmentary elevational view taken at the inlet and looking along line 8—8 in FIG. 4.

FIGS. 9, 10, 11, 12 and 13 are fragmentary elevational views taken along successive sections along the stream of signatures as viewed along correspondingly numbered lines in FIG. 4.

FIGS. 15a-15d are a series of stop motion views showing a displaced signature being progressively brought into aligned condition.

Figure 4:
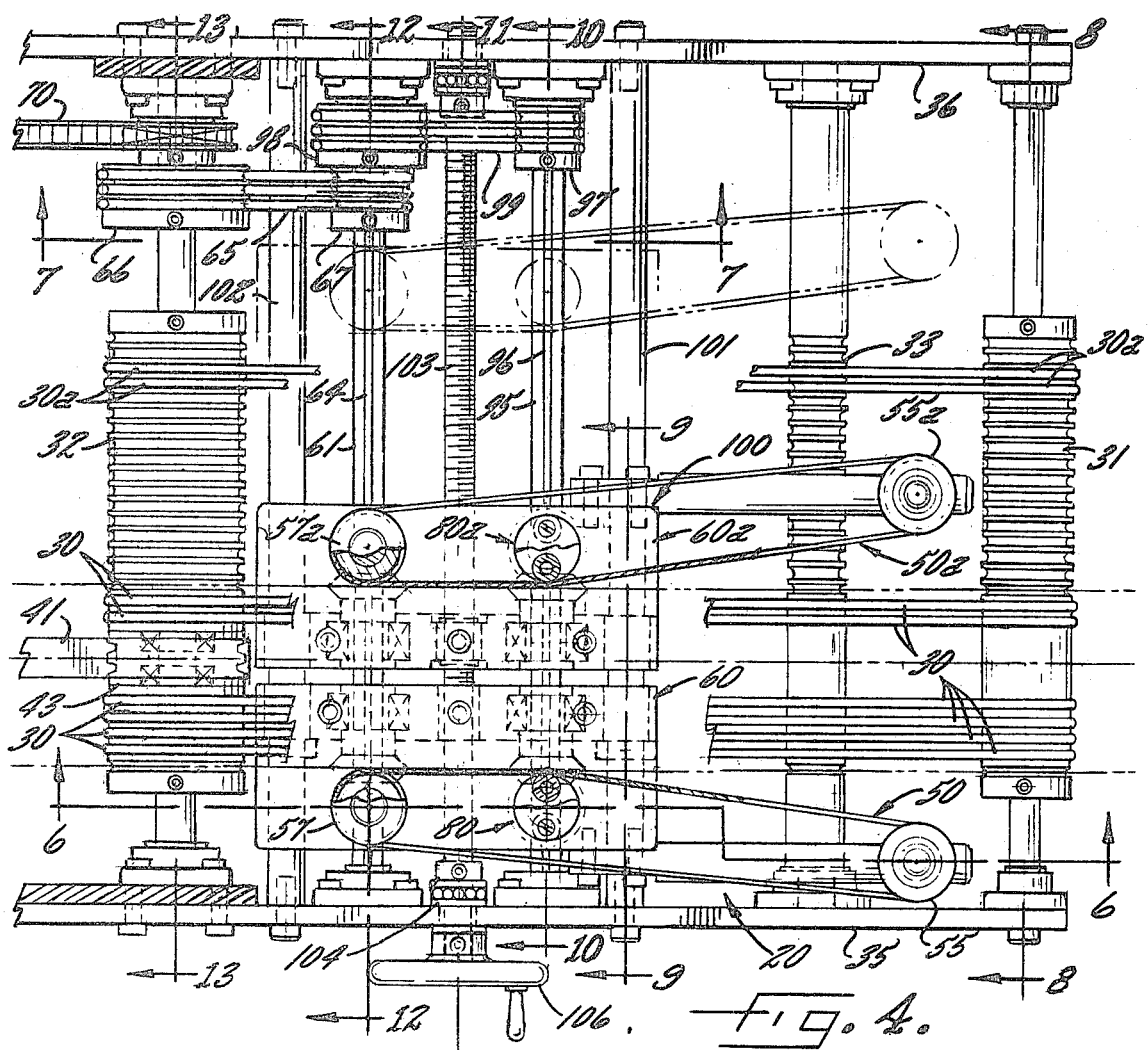
FIG. 4 is an enlarged top view of the jogging device as viewed along line 4—4 in FIG. 2.

While the invention has been described in connection with a preferred embodiment, it will be understood that we do not intend to be limited to the particular embodiment shown but intend, on the contrary, to cover the various alternative and equivalent constructions included within the spirit and scope of the appended claims.

Turning now to FIGS. 1 and 2 there is shown a jogging stacking and bundling assembly for signatures received on an infeed belt 19. It comprises a jogging device 20 constructed in accordance with the invention for producing an aligned stream of signatures. Such signatures are fed into a twisting conveyor 21 to turn the stream of signatures up on edge following which they are accumulated in a stacking assembly 22 to form a horizontal stack 23 which is slowly transported by a stack conveyor 24, the advancement of the stack and the accumulation of the signatures into a condition of register being facilitated by a set of rotary beaters 25. The twisting conveyor 21 and a stacking and bundling assembly 22 are disclosed and claimed in prior Newsome Application, Ser. No. 198,344 on Bundling Mechanism for Signatures which was filed Oct. 20, 1980 now U.S. Pat. No. 4,330,116. The infeed conveyor, its jogging device, the twisting conveyor and the rotary beaters are all powered from a press drive 26 via a variable ratio driving connection 27 (FIG. 3) whereas the stack conveyor 24 is powered by the drive 26 via a separate variable ratio connection 28.

In operation, a series of signatures S fed in shingled relation are first jogged at 20 into alignment with one another, twisted at 21 through an angle of 90 degrees, and accumulated at 22 into a horizontally extending stack 23, with the built-up portion of the stack being tied into a bundle from time to time for storage or transport into a signature assembling machine.

In order to insure the production of a neat and "monolithic" bundle, in which all of the signatures are in perfect register with one another, it is necessary that the stream from which the stack is formed be in a condition of perfect alignment. Such alignment has been difficult to achieve by conventional joggers, particularly when individual signatures are irregularly shifted or skewed with respect to the stream and particularly where the degree of shifting or skew approaches or exceeds the throw of the vibrator in the jogging device.

In accordance with the present invention a horizontal delivery belt carries the stream of signatures in shingled relation. A pair of upstanding guide belts, driven at the same speed as the delivery belt, straddle the delivery belt and present opposed faces thereto, each belt being mounted on vertically extending upstream and downstream sheaves. The guide belts are convergently arranged, with the downstream sheaves being spaced to define between them a discharge opening having a desired width of the stream and the upstream sheaves being spread apart with respect to the downstream sheaves to define a funnel-like entryway adequate to accommodate entry of the stream in non-aligned condition and with individual signatures irregularly displaced from the stream. A pulsating shifter means behind the presented face of each belt, and coupled to the driving means, repetitively moves, or vibrates, the belt face from a reference position to a thrown position in which the belts are angularly bowed mutually inwardly toward the stream, thereby dividing each face into a convergent upstream portion and a momentarily parallel downstream portion. The throw of the shifter means is such that the downstream portion in its thrown position is substantially parallel to the direction of movement of the stream for acting upon the edges of the stream for correcting any residual misalignment.

A shingled stream of signatures S is supplied by the in-feed conveyor 19 to the jogging device 20. The jogging device has a delivery belt 30 which is trained about an inlet pulley 31 and an outlet pulley 32, as well as about idler rollers 33, 34 which are at a lower level (see FIG. 6). The pulleys and idlers are all journalled between a pair of vertical frame plates 35, 36. The belt 30, in the present instance, consists of loops or strands of elastomeric material occupying individual grooves in the pulleys.

Figure 13:
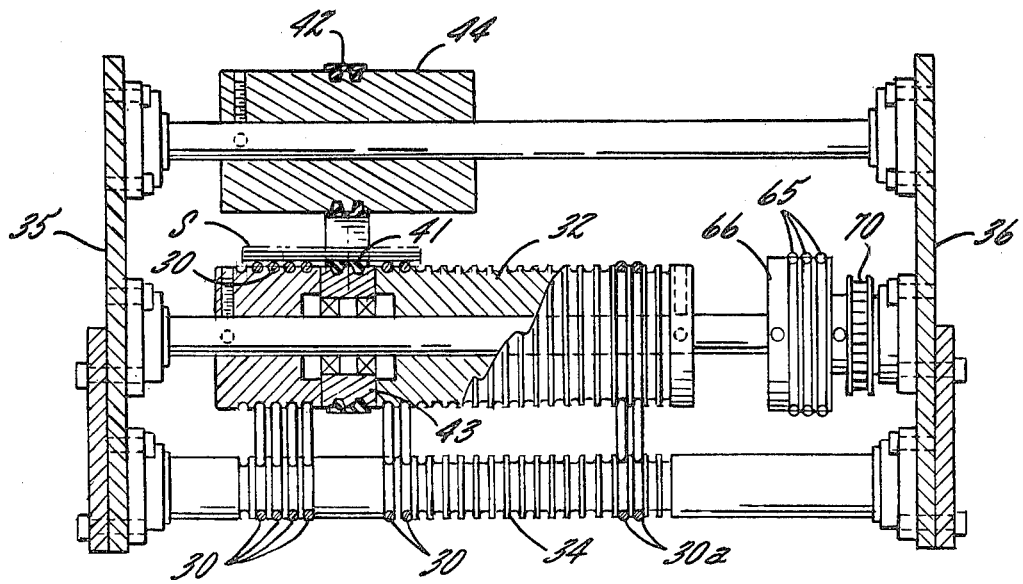

For the purpose of coupling the delivery belt 30 to the twisting conveyor 21, it will be understood that the twisting conveyor is formed of two loops of narrow belting arranged face-to-face, a lower loop 41 and an upper loop 42 (see FIGS. 6 and 13). The lower loop has an inlet pulley in the form of an idler 43 while the upper loop is trained about an inlet pulley in the form of an idler 44. In operation signatures passing from the delivery belt 30 enter the nip between the face-to-face belts 41, 42, with the stream of signatures being held between the belts snugly as the stream is twisted through an angle of 90 degrees as described in the copending application.

Figure 5:
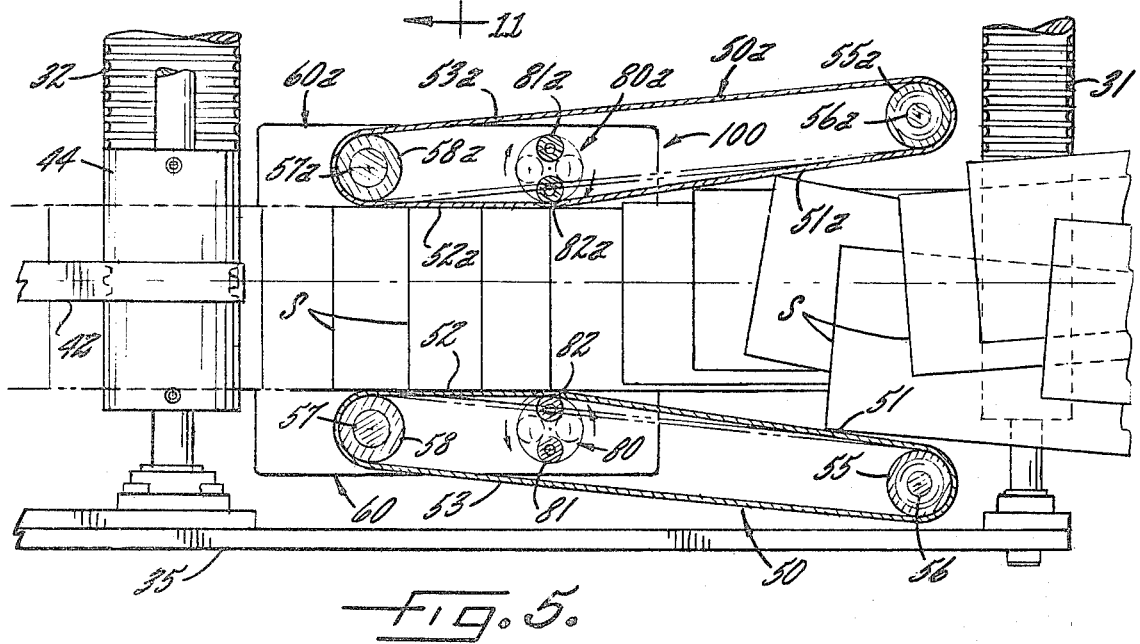
FIG. 5 is a fragmentary horizontal section taken through the guide belts and showing the guide belts acting upon an incoming stream of displaced signatures.

In carrying out the present invention there are provided, in straddling relation to the delivery belt 30, a pair of upstanding guide belts presenting opposed faces. The first belt 50 (FIG. 5) presents a face having an upstream portion 51 and a downstream portion 52, with the loop being completed through the back or return side 53. At its upstream end the belt 50 is trained about an upstream sheave 55 which is in the form of an idler mounted upon a vertical shaft 56. At its downstream end the belt is trained about a downstream sheave 57 mounted upon a driven shaft 58 which is supported by bearings 59, on a subframe 60, an extension of which also supports the idler 55.

Power is supplied to the shaft 58 from a horizontal shaft 61 through a pair of bevel gears 62, the lower one of which has a sleeve 63 coupled to the shaft. For driving the shaft 61 an intermediate belt 65 is provided (FIG. 4) trained about pulleys 66, 67, the pulley 66 being secured to the same shaft as the delivery belt pulley 32. For driving both of the pulleys 32, 66 there is provided a chain 70 (FIG. 1) which is driven from an angle drive 71 which in turn is driven via a belt 72 from a second angle drive 73 associated with a servo motor 74 which serves, also, to drive the twisting conveyor via a belt 75.

In accordance with the invention two guide belts are provided in mirror image with their faces opposed to one another for acting upon opposite sides of the stream. The second guide belt, indicated at 50a, has an upstream face 51a and a downstream face 52a as well as a back, or return side 53a. The belt is trained about an upstream sheave 55a in the form of an idler on shaft 56a and about a driven sheave 57a secured to a drive shaft 58a supported by bearings 59a which are mounted in a subframe 60a having a forward extension which supports the idler 55a.

Power is supplied to the shaft 58a from the horizontal shaft 61 through a pair of bevel gears 62a. The lower one of the bevel gears includes a sleeve 63a which slidably engages a longitudinally extending key 64 on the shaft to permit adjustment for the width of the stream of signatures, as will be discussed in due course. As a result, when the cross shaft 61 is rotated, both of the driven sheaves 57, 57a rotate in unison with one another and in opposite directions.

Figure 10:
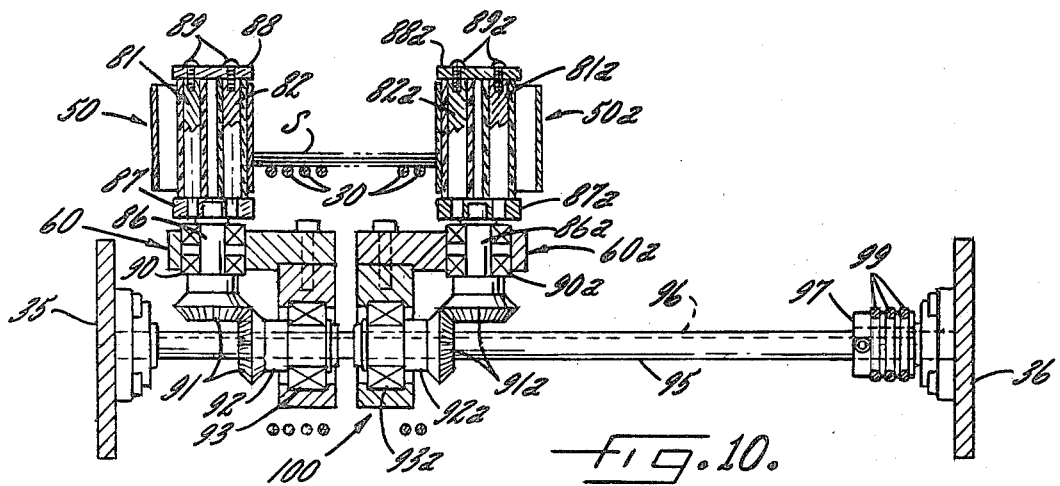
Figure 11:
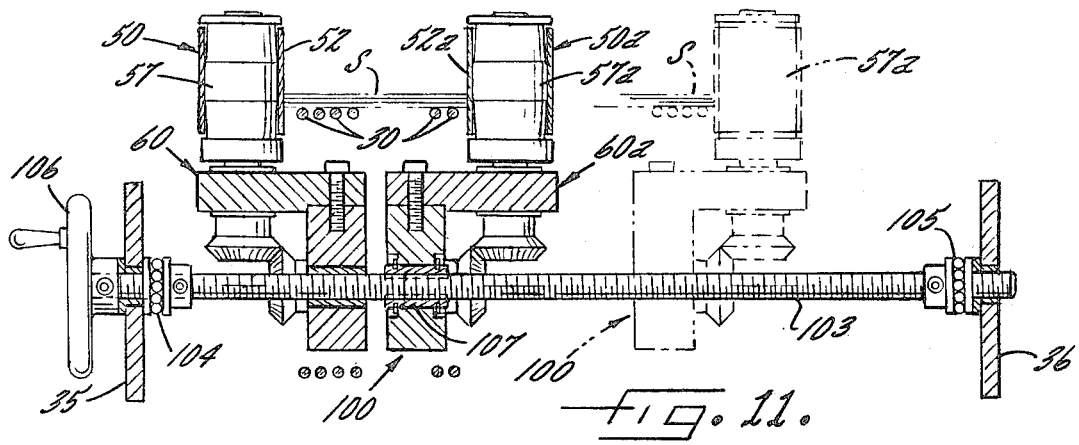
Figure 12:
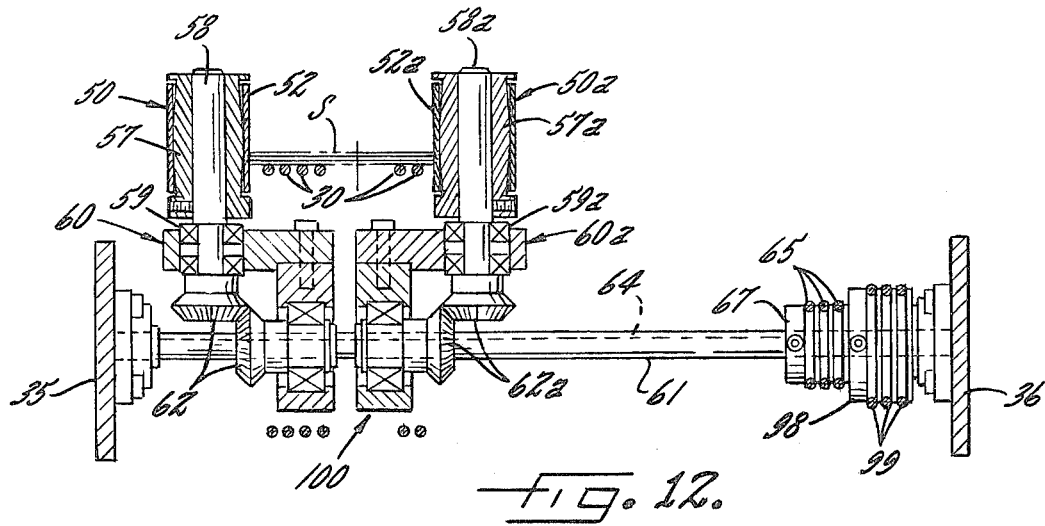

In carrying out the invention the guide belts are convergently arranged with the downstream sheaves 57, 57a thereof being spaced to define between them a discharge opening having the desired width of the stream in the aligned state. Such spacing is illustrated in FIGS. 10, 11 and 12. The upstream sheaves are spread apart with respect to the downstream sheaves by substantially equal amounts of offset, indicated at O in FIG. 15a, so that the two guide belts, taken together, define a funnel-like entryway adequate to accommodate entry of the stream in a non-aligned condition, with individual signatures irregularly displaced from the stream, as graphically illustrated in FIG. 5.

In accordance with one of the important aspects of the present invention each of the guide belts has a pulsating shifter behind the presented faces with a drive connection to the driving means for repetitively moving the faces from a substantially planar reference position to a thrown position in which the belts are angularly bowed mutually inwardly. The pulsating shifter, or vibrating, means preferably takes the form of an eccentric roller mounted for orbital movement about the axis of a vertical drive shaft and having a length substantially equal to the width of the associated guide belt. Preferably a pair of eccentric rollers are used driven from a common drive shaft and offset by the same radius and occupying diametrical positions so that the rollers orbit in the locus of a circle centered about the axis of the drive shaft.

Thus referring to FIGS. 6, 6a and 10 the pulsating shifter 80 behind the face of belt 50 will be described: It includes a pair of vertically arranged rollers 81, 82 having axes 83, 84, respectively which are spaced at equal radii with respect to the axis 85 of a drive shaft 86. For mounting the rollers it is convenient to journal them between a pair of vertically opposed discs, a lower disc 87 which is secured to the shaft, and an upper disc 88 which is bored for reception of pivot pins 89.

The shaft 86 which supports and drives the rollers is mounted in a bearing 90 which is supported in the subframe 60. At the bottom of the shaft 86 is a pair of beveled gears 91, the lower one of which has a sleeve 92 supported in a bearing 93, the sleeve being telescoped over a second cross shaft 95 having a key 96 extending longitudinally therealong. The second cross shaft 95 is driven by a pulley 97 coupled to a drive pulley 98 on the first cross shaft 61 by means of a belt 99.

A substantially duplicate periodic shifting, or vibrating, mechanism is employed behind the face of the opposing belt 50a. The same reference numerals will again be employed to indicate corresponding parts with addition of subscript a. Thus the shifter 80a has rollers 81a, 82a diametrically related to the axis 85a of a vertical drive shaft 86a, with the two rollers being contained between discs 87a, 88a. The drive shaft is mounted in bearings 90a in the subframe 60a with driving to a pair of bevel gears 91a, the lower one of which has a slidable drive connection in the form of a sleeve 92a which is journaled in a bearing 93a in the subframe 60a, the sleeve being grooved to provide a keyed connection with respect to the key 96 and its cross shaft.

Thus when the cross shaft 95 is rotated, in predetermined ratio, with the cross shaft 61, the roller drive shafts 86, 86a rotate in unison with one another, and in opposite directions, to bring the rollers into successive engagement with the associated belt. The belts are thus vibrated between a reference planar position indicated by the full lines in FIGS. 15a–15d to a thrown position indicated by the dotted lines in those figures and in which the belts are angularly bowed mutually inwardly toward the stream to divide the belt faces into convergent upstream portions 51, 51a and downstream portions 52, 52a. The throw of the rollers between the two positions is such that the downstream portions in their thrown positions are substantially parallel to the direction of movement of the stream for jogging the straight edges of the stream from opposite sides to insure a condition of precise alignment as the stream moves through the discharge opening.

The rollers for each belt are preferably phased so that they strike the belt in unison with one another, and the drive ratio is such that the peripheral speed of the rollers exceeds the speed of the engaged belt and is in the same direction. Preferably the speed of rotation of the roller drive shafts is such that each guide belt is struck by a roller eight times for each passing foot of the guide belt; in other words, the pulsations applied to the belt per unit of time occur at a rate which is eight times the belt speed expressed in feet per same unit of time. While this frequency of impact is preferred, it is not essential and the pulsations may take place within the range of three to twelve times the belt speed expressed in feet per same unit of time without departing from the invention.

With regard to the amount of throw at each belt face, using a belt having a sheave spacing of two feet, I prefer to use a throw of approximately $\frac{3}{8}$ inch. Such sheave spacing need not be adhered to in practicing the invention, however, and where the sheave spacing ranges between, say, one foot and five feet the amplitude of the throw, approximately proportioned thereto, may range between, say $\frac{3}{8}$ and 2 inches. If desired the throw may be tailored to the length of the upstream portion of the guide belts and may range between 1/10 inch and $\frac{1}{2}$ inch for each foot of length of the upstream portion of the guide belts.

With respect to the velocity of throw, the average speed of inward movement of the belts should be approximately 5/6 V, where V is the belt velocity in feet per second. However, because of the sinusoidal nature of the movement average velocity is not as significant as peak velocity. Indeed, it is one of the features of the present invention that the axis of the roller drive shaft is spaced behind the reference position of the belt so that the roller is engaged with the belt during approximately one-half, or somewhat less, of its orbital revolution so that the roller impacts the belt at substantially its maximum velocity in the forward direction. As the roller moves "on center" at the end of the throw, the velocity in the forward direction is, in accordance with its sinusoidal variation, reduced to zero. Such reduction of the throw velocity to zero approaching the end of the stroke has the beneficial result that the tendency of an engaged signature to over-travel beyond its aligned position in the stream is reduced.

Figure 14A:
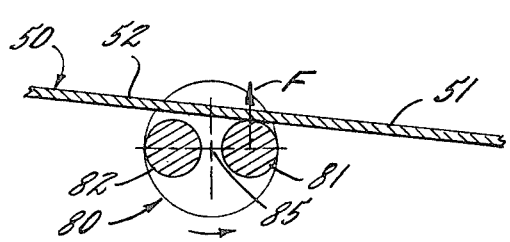
FIGS. 14a and 14b are fragmentary views showing a guide belt engaged by a roller traveling at maximum velocity in the forward direction at impact and at zero velocity in the forward direction at point of maximum throw, respectively.
Figure 14B:
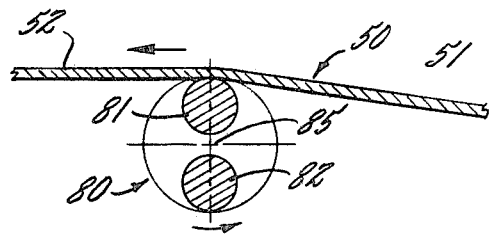

This action is illustrated in FIG. 14a where it will be noted that the axis of rotation 85 of the drive shaft is spaced sufficiently behind the face 51, 52 of the belt so that the roller impacts the belt with maximum speed in the "forward" direction which is indicated at F. Any displaced signature which is in contact with the belt at the instant of impact is, therefore, impelled with maximum velocity toward the stream. However, 90 degrees later, when the roller 81 is in the "wiping" condition illustrated in FIG. 14b, there is zero velocity in the "forward" direction and less likelihood that any in-feed signature will overtravel beyond its desired position in the stream. This action is particularly advantageous with respect to any signatures which are only slightly out of alignment; they will simply be pressed at low velocity into alignment with the stream. Such low velocity pressing, as contrasted with impacting, is particularly important along the downstream portion 52 of the belt face.

While it is strongly preferred that two rollers 81, 82 be employed orbiting about a common axis, the invention is not limited thereto and, depending upon certain specialized conditions, a single roller or even three rollers, equally spaced, may be used. To preserve the same number of impacts per foot of belt length, however, approximately eight impacts being preferred, reducing the number of rollers to one will require a doubling of the speed of the drive shaft and thus the single roller will strike the belt with greater impact which may be desirable where the signatures are heavy and relatively stiff. On the other hand, where the device is used with signatures requiring more frequent, lighter blows, resort may be had to the use of a three-roller cluster but there are no situations visualized which require more than three rollers.

It is one of the inherent features of the construction described above that the more a signature is displaced from the stream the smaller is the amplitude of the restoring movement. The reason for this is that the more a signature is displaced from the stream, the earlier it will strike a guide belt. In the region of early encounter the vibrating movement of the belt is proportionately less than it is at the central portion of the belt, i.e. at the location of the pulsing rollers. It might be assumed that the greater the displacement the greater should be the amplitude of the restoring motion, but this is not so. The difficulty is that the more the signature is exposed the more delicate is the problem of getting it back into the stream. Thus in accordance with the present invention, the more the signature is exposed the smaller are the initial impacts which act upon the signature. Thus a displaced signature in the present device is initially exposed to a series of very small nudges. This will be made clear by considering the restoration, to the stream, of a typically displaced signature as set forth in stop motion views 15a–15d. In FIG. 15a the displaced signature, indicated at S, is both skewed and laterally displaced, resulting in exposed corner S' at the front edge of the signature and an exposed corner S" at the trailing edge.

It will be assumed that FIG. 15a shows the condition of the signature S at the entry way. Where one corner the signature is engaged by the belt prior to the engagement of the other, a skewed signature will be promptly moved into a position in which both corners are engaged.

Thus as the skewed signature moves forwardly with the stream, simultaneous impacts will occur at the front corner S' and rear corner S", one for every inch and a half of forward movement, axially rotating the signature successively into the positions illustrated in FIGS. 15b and 15c. One of the advantages of the present construction, in which the downstream portions of the belts, in thrown condition, are parallel to one another, may be seen by comparing the position of the signature S in 15c with that in 15d. In FIG. 15c the front edge of the signature has been aligned but the trailing edge is still out of alignment. The exposed corner S" is nudged by the vibrating belt 50 in a series of small impacts. As might be expected there is risk that an impact applied to the trailing edge of the signature will, by gross movement of the signature, dislodge the front edge from its aligned position. However, such dislodgement is impossible in this construction since the front portion of the signature is, by that time, confined by the downstream faces 52, 52a of the belts in their thrown positions.

Thus it is seen that the downstream portion of the jogger performs at least two distinct functions: In the first place it holds the front edge of the signature precisely in alignment while the trailing edge is being acted upon. Secondly, the phased impacts from the belts in the downstream section jog the straight edges of the stream from opposite sides to insure a condition of precise alignment as the stream moves through the discharge opening.

In the example illustrated in FIGS. 15a–15d, the signature S was dislodged primarily in skew. However, a similar analysis will show that the construction is just as efficient in aligning a sheet which enters the device laterally displaced in one direction or the other but without the sheet being skewed. In short, the construction is capable of aligning a signature with the stream regardless of the nature of the displacement and almost regardless of the degree of the displacement. In the case of a large skew displacement, conventional joggers often bend over the exposed corner, or edge, making alignment impossible and spoiling the stack subsequently formed. The bent-over signature must then be manually retrieved which is a difficult and expensive operation. Such bending of a corner or edge is almost unknown in the use of the jogger device of the present construction.

It is one of the further features of the present design that it is capable of accommodating signatures having a wide variation in width. For the purpose of adjusting the width, means are provided for moving the subframe 60a broadwise while keeping it parallel to the subframe 60 thereby to bring about the same amount of change in width at the discharge opening and at the funnel-like entry way. For this purpose the subframe 60a forms a carriage 100 which is slidable on transversely extending way bars 101, 102 which are secured at their ends to the side plates 35, 36 of the frame. A stationarily mounted lead screw, also extending transversely, is threaded into a captive nut on a carriage. The lead screw, indicated at 103, is mounted in bearings 104, 105 and is provided, at least at one end, with a crank 106. The captive nut in the carriage is illustrated at 107 in FIG. 11. Thus when the crank is turned, the carriage is propelled either toward or away from the stationary subframe 60, for example, to a substantially widened position as illustrated in dot-dash in FIGS. 4 and 11.

Provision is made for adding additional loops to the belt 30 in the form of spare grooves in the sheaves 31–34 to accommodate the wider signatures.

Because of the use of parallel keyed drive shafts 61, 95 engaging sleeves 63a, 92a in the angle gearing, drive connections to the sheave 57a and rollers 81a, 82a are maintained in all positions of the carriage, greatly simplifying the making of a width adjustment. And since the two drive shafts 61, 95 are constantly coupled by pulleys 97,98 a constant ratio exists between the belt speed and the impact rate of the rollers for all signature widths.

Figure 16:
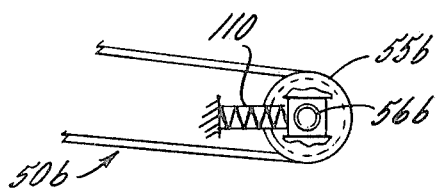
FIG. 16 is a fragment showing use of an outwardly biased idler roller engaging a guide belt.

It is found that the device described above can operate successfully using either elastic or relatively inelastic belts 50, 50a. Where elastic belts are used, for example, formed of rubber or rubber substitute, the belt is simply stretched slightly to accommodate the bowed condition. However, it is found that successful operation can be achieved with belts which, while flexible, are longitudinally inelastic by reason of steel reinforcing wires or the like. Apparently, the elongation necessary to accompany the bowing is sufficiently slight so that it the sheaves about which the belts are trained, and the mechanical support therefor, enables the necessary throw to be achieved without setting up excessive tension in the belts. However, if desired, the upstream sheave of each belt may be made of light weight material, mounted for limited transaxial movement and biased in a direction to elongate the loop so that the upstream sheave can promptly respond to the bowing movements. This is illustrated in FIG. 16 where the same reference numerals are employed with addition of subscript b to designate similar parts. Bias is provided by a spring 110.

While we prefer to employ two convergent guide belts vibrated in synchronism with one another thereby to act simultaneously on both of the presented edges of the passing signatures, the invention is not necessarily limited thereto and, for certain purposes, one-half of the total assembly may suffice. That is, one of the assemblies consisting of a belt and its pulsating shifter may be replaced by a straight longitudinal guide, with reliance being placed upon the opposite belt and its shifter to achieve the jogging effect. Such an arrangement would be possible, for example, where the expected displacement is small or primarily in one direction.

While the device described employs a reference condition for the belt which is planar, it is not necessary that the belt form a perfect plane. The term "substantially planar" would thus apply to a situation in which the belt has a slightly bowed reference condition. Also while it is desirable for the delivery belt and its associated guide belts to operate at the same speed, the speeds need not be identical to one another. Similarly, while it is preferred to employ identical amounts of offset for the upstream sheaves and while it is preferred to use symmetrically arranged belts of the same length, the desired result can be achieved without adhering to perfect symmetry. Then too, while the delivery belt is illustrated as being perfectly horizontal, cooperating with belts mounted upon sheaves which are vertically oriented, these terms should be considered relative and subject to slight variation without departing from the invention; for example, the entire device may be tilted slightly so that the signatures are carried at a shallow angle either uphill or downhill. Also, while orbited rollers are preferred as a pulsating shifter mechanism for the guide belts, it will be apparent to one skilled in the art that equivalent pulsating means, producing the same, or similar, belt motion, may be used while still achieving the benefits of the present invention.

Finally, while the invention has particular application and advantage in aligning a stream of signatures in a printing or publishing house, it will be understood that the invention is not limited to signatures but is applicable wherever objects of thin, generally rectangular configuration are delivered in shingled relation on a delivery belt; therefore, the term "signature" as used herein shall be deemed to include equivalent objects.

Conforming Width of Conveyor Belt to Space Between Guide Belts

As already stated, the guide belts are mounted upon respective subframes 60, 60a with the subframe 60a being in the form of a carriage 100 laterally adjustable to accommodate the exact dimensions of the signatures being handled. It is one of the features of the present construction that the conveyor belt 30 is quickly and easily adjustable, in width, to match the spacing between the guide belts. This is accomplished by arranging the conveyor inlet pulley 31 upstream of the upstream sheaves of the guide belt and by arranging the outlet pulley 32 downstream from the downstream sheaves of the guide belt so that the space between the guide belts is occupied by straight unsupported portions of the active loops of conveyor belt. By "active" loops is meant the loops performing an active conveying function. The conveyor pulleys 31, 32 are elongated to produce outboard portions extending laterally beyond the guide belts and a set of endless reserve, or idler, loops are provided normally occupying a storage position encircling the outboard portions of the pulleys. The guide belts are unobstructed along one edge thereof so as to enable free manual transfer of idler loops from the storage position into the active grooves in the pulleys when the spacing between the guide belts is increased and to enable free return of the active loops from the active grooves to the storage position when the spacing between the guide belts is decreased. By the term "unsupported" portions of the active loops is meant those portions which lie between the supporting pulleys 31, 32.

Thus, as shown in FIGS. 4 and 8, the conveyor pulleys 31, 32 are not only spaced respectively upstream and downstream from the sheaves 55, 55a and 57, 57a which support the guide belts, but the pulleys are elongated so as to provide outboard portions which extend laterally beyond the adjacent guide belt 50a, with the pulleys being formed with "storage" grooves for mounting reserve or idler belts 30a.

In carrying out the invention the upper edge of the guide belt 50a is made unobstructed by bringing in the drive for the sheaves 55a, 57a from the bottom so that the reserve loops 30a may be freely transferred, by manual effort, from the storage grooves into the active grooves when the spacing between the guide belts is increased and returned from the active grooves to the storage grooves when the spacing between the guide belts is decreased.

Preferably the loops of belt 30, 30a are formed of plastic, rubber or similar material which is resiliently stretchable so that an individual loop may be stretched for passage over the top edge of the adjacent guide belt 50a into active position. Alternatively, the shaft of the pulley 31 may be mounted so as to be transaxially shiftable between the illustrated running position and a displaced position sufficient to create the necessary amount of slack for free transfer from one position to the other.

In any event because of the convenient shiftability of the carriage 100 and the convenient transfer of the loops of conveyor belt from storage to active position and return, accommodating the device to a different width of signature, over a broad range, may be accomplished by the operator in just a few minutes time.

What is claimed is:

1. In a device for aligning signatures fed in shingled relation prior to stacking them, which includes a frame, a horizontal delivery belt trained about inlet and outlet pulleys supported on the frame to form a signature supporting run carrying a stream of signatures in shingled relation, driving means for driving the belt for transportation of the signatures, a pair of upstanding guide belts straddling the delivery belt and presenting opposed faces thereto, each guide belt having an upstream sheave and a downstream sheave mounted in the frame on vertical shafts and coupled to the driving means for driving of the guide belts in unison with one another and at the same speed as the delivery belt, the guide belts being convergently arranged with the downstream sheaves thereof being spaced to define between them a discharge opening having the desired width of the stream in the aligned state, the upstream sheaves being spread apart with respect to the downstream sheaves by substantially equal amounts of offset to define a funnel-like entryway adequate to accommodate entry of the stream in non-aligned condition with individual signatures irregularly displaced from the stream, and pulsating shifter means behind the presented faces of the belts and having a drive connection coupled to the driving means for repetitively moving said faces from a substantially planar reference position to a thrown position in which the belts are angularly bowed mutually inwardly toward the stream thereby dividing each face into a convergent upstream portion and a downstream portion, the throw of the shifter means being such that the downstream portions in their thrown positions are substantially parallel to the direction of movement of the stream for jogging the straight edges of the stream from opposite sides to insure a condition of precise alignment as the stream moves through the discharge opening.

2. The combination as claimed in claim 1 in which the shifter means behind the presented faces of the belts move mutually inwardly in phase with one another.

3. The combination as claimed in claim 1 in which the pulsations of the shifter means per unit of time occur at a rate which is about eight times the belt speed expressed in feet per same unit of time.

4. The combination as claimed in claim 1 in which the pulsations of the shifter means per unit of time occur at a rate within the range of three to twelve times the belt speed expressed in feet per same unit of time.

5. The combination as claimed in claim 1 in which the shifter means is coupled to the driving means so that the average speed of inward movement of the shifter means is approximately 5/6 V where V is the belt velocity in feet per second.

6. The combination as claimed in claim 1 in which the throw of the shifter means is approximately five-eighths inch.

7. The combination as claimed in claim 1 in which the throw of the shifter means lies between one-tenth inch and one-half inch for each foot of length of the upstream portion of the guide belts and the included angle of the guide belts in their reference condition lies within the range of five degrees to twenty degrees.

8. The combination as claimed in claim 1 in which the center-to-center distance between the sheaves of each of the guide belts is between one foot and five feet and in which the amplitude of movement of the shifter means is three-eighths to two inches.

9. The combination as claimed in claim 1 in which the shifter means for each guide belt is in the form of an eccentric with driving means for periodically pressing the belt against the presented edges of the signatures.

10. The combination as claimed in claim 1 in which the shifter means for each guide belt is in the form of a vibrated shifting element with driving means for periodically pressing the belt against the presented edges of the signatures, the pressing element being coupled to the driving means for movement in synchronism therewith.

11. The combination as claimed in claim 1 in which the shifter means is in the form of an eccentric roller having a length substantially equal to the width of the associated guide belt, and means coupled to the drive connection for orbiting the roller about a vertical axis.

12. The combination as claimed in claim 1 in which the shifter means is in the form of a plurality of eccentric rollers having a common drive shaft, with the rollers being arranged in the locus of a circle centered about the axis of the drive shaft.

13. The combination as claimed in claim 1 in which the shifter means is in the form of a pair of eccentric rollers having a common drive shaft and offset by the same radius therefrom and occupying diametrical positions so that the rollers orbit in the locus of a circle centered about the axis of the drive shaft.

14. The combination as claimed in claim 1 in which the shifter means includes a roller mounted for orbital movement about a vertical drive shaft, the ratio of the drive connection therefor being such that the peripheral speed of the roller exceeds the speed of the engaged belt and is in the same direction.

15. The combination as claimed in claim 1 in which the shifter means includes a roller mounted for oribital movement about a vertical drive shaft, the axis of the drive shaft being spaced behind the reference position of the belt so that the roller is engaged with the belt during approximately one-half of its orbital revolution and so that the roller impacts the belt at substantially its maximum velocity in the forward direction with the velocity in the forward direction being reduced to zero at the point of maximum throw thereby to reduce the tendency of an engaged signature to overtravel beyond its aligned position in the stream.

16. The combination as claimed in claim 1 in which the guide belts are formed of longitudinally elastic material so as to stretch to accommodate the bowing movement.

17. The combination as claimed in claim 1 in which the guide belts are formed of readily bendable but longitudinally inelastic material and in which the throw of the shifter means is sufficiently limited so that the throw is achieved sort of setting up excessive tension in the belts.

18. The combination as claimed in claim 1 in which the downstream sheave in each belt has a driving connection with the driving means and in which the upstream sheave is an idler rotating free of any driving connection.

19. The combination as claimed in claim 1 in which the upstream sheave of each belt is an idler mounted for limited transaxial movement and biased in a direction to elongate the loop so that the upstream sheave serves as a take-up in the accommodation of bowing movements of the belt, the upstream sheave being formed of light weight material for prompt response to the bowing movements of the belt.

20. The combination as claimed in claim 1 in which a movable carriage is provided for one of the guide belts, the carriage mounting the upstream and downstream sheaves associated therewith and the pulsating shifter means therefor, and means for laterally adjusting the position of the carriage thereby to accommodate the aligning device to streams of different width.

21. The combination as claimed in claim 20 in which the means for moving the carriage is in the form of a lead screw coupled to the frame.

22. The combination as claimed in claim 1 in which the downstream sheaves of the belts are coupled to a first common drive shaft and in which the pulsating shifter means for the belts are coupled to a second common drive shaft, the drive shafts both being coupled to the driving means for rotation at a predetermined speed ratio with respect to one another.

23. The combination as claimed in claim 1 in which a first one of the guide belts and its shifter means is stationarily mounted in the frame, a carriage movable into a position of adjustment with respect to the frame broadwise with respect to the first guide belt, the second guide belt and its shifter means being mounted on the carriage, the carriage having respective slideable drive connections therefor, means including a first cross shaft for powering both downstream sheaves and means including a second cross shaft for powering both shifter means, the cross shafts extending parallel to one another in the frame in the direction of movement of the carriage, the cross shafts having respective longitudinally extending keys for engaging the slideable drive connections on the carriage for effective driving in all positions of adjustment of the carriage.

24. The combination as claimed in claim 1 in which the presented face of each belt in its reference position lies substantially in a plane.

25. The combination as claimed in claim 1 in which the horizontal delivery belt consists of a plurality of endless active loops arranged side by side in active grooves formed in the inlet and outlet pulleys, the pulleys being located at such height with respect to the guide belts that the signatures thereon are engaged at their lateral edges by an axially central portion of each of the guide belts, the inlet pulley being arranged upstream of the upstream sheaves and the outlet pulley being arranged downstream of the downstream sheaves so that the space between the guide belts is occupied by straight unsupported portions of the active loops, the pulleys being elongated to produce outboard portions extending laterally beyond the guide belts, a set of endless idler loops normally riding in storage grooves in the outboard portions of the pulleys, means on the frame for adjusting the lateral spacing between the guide belts, the guide belts being unobstructed along one edge thereof to enable free manual transfer of idler loops from the storage grooves into the active grooves in the pulleys when the spacing between the guide belts is increased and to enable free return of active loops from the active grooves to the storage grooves when the spacing between the guide belts is decreased.

26. The combination as claimed in claim 1 in which the horizontal delivery belt consists of a plurality of endless active loops arranged side by side in active grooves formed in the inlet and outlet pulleys, the pulleys being located at such height with respect to the guide belts that the signatures thereon are engaged at their lateral edges by an axially central portion of each of the guide belts, the inlet pulley being arranged upstream of the upstream sheaves and the outlet pulley being arranged downstream of the downstream sheaves so that the space between the guide belts is occupied by straight unsupported portions of the active loops, the pulleys being elongated to produce outboard portions extending laterally beyond the guide belts, a set of endless reserve loops normally occupying a storage position encircling the outboard portions of the pulleys, means on the frame for adjusting the lateral spacing between the guide belts, the guide belts being unobstructed along one edge thereof and the loops being resiliently stretchable to enable free manual transfer of idler loops from the storage position into the active grooves in the pulleys when the spacing between the guide belts is increased and to enable free return of active loops from the active grooves to the storage position when the spacing between the guide belts is decreased.

27. In a device for aligning signatures fed in shingled relation prior to stacking them, which includes a frame, a horizontal delivery belt supported on the frame and carrying a stream of signatures in shingled relation, driving means for driving the belt for transportion of the signatures, a pair of upstanding guide members straddling the delivery belt and presenting opposed faces thereto, at least one of the guide members being in the form of a guide belt, the guide belt having an upstream sheave and a downstream sheave mounted in the frame on vertical shafts and coupled to the driving means for driving of the guide belt at the same speed as the delivery belt, the guide belt being convergently arranged with the downstream sheave thereof defining a discharge opening having the desired width of the stream in the aligned state, the upstream sheave being offset laterally with respect to the downstream sheave to define a funnel-like entryway adequate to accommodate entry of the stream in non-aligned condition with individual signatures irregularly displaced from the stream, and pulsating shifter means behind the presented face of the belt and coupled to the driving means for repetitively moving said face from a substantially planar reference position to a thrown position in which the belt is angularly bowed toward the stream thereby dividing the face into a convergent upstream portion and a downstream portion, the throw of the shifter means being such that the downstream portion in its thrown position is substantially parallel to the direction of movement of the stream for jogging the presented edge of the stream to insure a condition of alignment as the stream moves through the discharge opening.

\* \* \* \* \*